United States Patent
Hunt

(10) Patent No.: US 10,424,057 B2
(45) Date of Patent: *Sep. 24, 2019

(54) ACTIVE REAL-TIME CHARACTERIZATION SYSTEM FOR DETECTING PHYSICAL IMPERFECTIONS DURING SEMICONDUCTOR MANUFACTURING

(71) Applicant: The Boeing Company, Chicago, IL (US)

(72) Inventor: Jeffrey H. Hunt, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/902,106

(22) Filed: Feb. 22, 2018

(65) Prior Publication Data

US 2019/0259148 A1    Aug. 22, 2019

(51) Int. Cl.
| | | |
|---|---|---|
| G06T 7/00 | (2017.01) | |
| H04N 5/225 | (2006.01) | |
| H04N 5/33 | (2006.01) | |
| H04N 5/247 | (2006.01) | |

(52) U.S. Cl.
CPC ......... *G06T 7/0004* (2013.01); *H04N 5/2256* (2013.01); *H04N 5/247* (2013.01); *H04N 5/332* (2013.01); *G06T 2207/10048* (2013.01); *G06T 2207/10152* (2013.01); *G06T 2207/30148* (2013.01)

(58) Field of Classification Search
CPC combination set(s) only.
See application file for complete search history.

(56) References Cited

U.S. PATENT DOCUMENTS

| | | | |
|---|---|---|---|
| 5,710,429 A | * | 1/1998 | Alfano ............... G01N 21/49 250/330 |
| 5,973,778 A | | 10/1999 | Hunt |
| 6,781,686 B2 | | 8/2004 | Hunt |
| 6,788,405 B2 | | 9/2004 | Hunt |
| 6,795,175 B2 | | 9/2004 | Hunt |
| 6,798,502 B2 | | 9/2004 | Hunt |
| 6,819,844 B2 | | 11/2004 | Hunt |
| 7,289,656 B2 | | 10/2007 | Hunt |
| 7,304,305 B2 | | 12/2007 | Hunt |
| 7,757,558 B2 | | 7/2010 | Bossie et al. |

(Continued)

*Primary Examiner* — Janese Duley
(74) *Attorney, Agent, or Firm* — Toler Law Group, PC

(57) ABSTRACT

An active real-time characterization system for detecting unwanted elements and/or physical imperfections on a semiconductor wafer during manufacturing. Infrared and visible light sources output beams of coherent light directed at a particular area on the semiconductor wafer via associated polarizing control elements. A series of cameras, including a visible light camera, a visible light second harmonic generation camera, an infrared camera, an infrared second harmonic generation camera, a sum-frequency camera and a third-order camera are configured to receive return beams of light via associated polarizing control elements. The polarizing control elements include a polarizer, a quarter wave plate and/or a half wave plate. A processor processes the signals received from the cameras to detect unwanted elements and/or physical imperfections on the semiconductor wafer.

20 Claims, 4 Drawing Sheets

(56) References Cited

U.S. PATENT DOCUMENTS

| | | |
|---|---|---|
| 7,983,469 B2 | 7/2011 | Engelbart et al. |
| 8,664,583 B2 | 3/2014 | Hunt et al. |
| 8,789,837 B2 | 7/2014 | Chang et al. |
| 9,996,765 B2 * | 6/2018 | Yajko ........................ G06T 7/90 |
| 2003/0231302 A1 * | 12/2003 | Hunt ...................... G01N 21/94 |
| | | 356/237.2 |
| 2013/0048841 A1 | 2/2013 | Hunt et al. |
| 2013/0050685 A1 | 2/2013 | Hunt et al. |
| 2016/0119557 A1 | 4/2016 | Hunt et al. |
| 2017/0132799 A1 * | 5/2017 | Yajko ........................ G06T 7/90 |

* cited by examiner
ACTIVE REAL-TIME CHARACTERIZATION SYSTEM FOR DETECTING PHYSICAL IMPERFECTIONS DURING SEMICONDUCTOR MANUFACTURING

FIELD

This disclosure relates generally to an active real-time characterization system that detects unwanted elements and/or physical imperfections on the surface of a wafer during semiconductor manufacturing.

BACKGROUND

Semiconductor devices are typically fabricated through fabrication processes including a thin film process, a photolithography process, an etching process, a diffusion process, and the like. The fabrication of most compound semiconductor devices begins with growth of semiconductor thin films onto a substrate using deposition techniques. It can be extremely difficult to monitor the growth of semiconductor thin films in a vacuum chamber. Surface diagnostic tools must operate in ultra-high vacuum environments, making them unusable for semiconductor growth chambers. Semiconductor coverages of only a few molecular layers are particularly difficult to monitor (sense). These growth processes are, by definition, surface chemistry issues which can be difficult to obtain accurate quantitative status of the growth process. Damaged interfaces, such as those caused by whisker formation, can only be identified after the processing is complete.

Existing monitoring solutions are mostly based on heuristic and historical processes. There are some in-situ diagnostic solutions which show only that some characteristic has changed, but are incapable of identifying what has changed. Current diagnostic systems are typically ex-situ and only identify problems well after the in-process device (e.g., wafer) has been rendered defective. As a result, there is currently no way to identify and potentially correct any unwanted growth process during processing.

Accordingly, there is a need for a monitoring system which addresses the drawbacks identified above.

SUMMARY

In a first aspect, an active real-time characterization system detects unwanted elements and/or physical imperfections on a semiconductor wafer during manufacturing. The system includes an infrared light source for outputting a beam of coherent infrared light and an associated polarizing control element. The infrared light source is configured to direct the beam of coherent infrared light at a particular area on the semiconductor wafer through the associated polarizing control element. The system also includes a first visible light source for outputting a first beam of coherent visible light and an associated polarizing control element. The first visible light source is configured to direct the first beam of coherent visible light at the same particular area on the semiconductor wafer through the associated polarizing control element. The system further includes a visible light camera and a visible light second harmonic generation camera each having an associated polarizing control element. The visible light camera and visible light second harmonic generation camera are each configured to receive a first predetermined return beam of light from the particular area on the semiconductor wafer through the associated polarizing control element. The system still further includes an infrared camera and an infrared second harmonic generation camera each having an associated polarizing control element. The infrared camera and infrared second harmonic generation camera are each configured to receive a second predetermined return beam of light from the particular area on the semiconductor wafer through the associated polarizing control element. The system also includes a sum-frequency camera and an associated polarizing control element. The sum-frequency camera is configured to receive a third return beam of light from the particular area on the semiconductor wafer through the associated polarizing control element. Finally, the system includes a processor coupled to receive signals from the visible light camera, the visible light second harmonic generation camera, the infrared camera, the infrared second harmonic generation camera and the sum-frequency camera. The processor is configured to process the received signals to detect unwanted elements and/or physical imperfections on the semiconductor wafer.

In a further embodiment, the system may include a second visible light source for outputting a second beam of coherent visible light and an associated polarizing control element. The second visible light source may be configured to direct the second beam of coherent visible light at the same particular area on the semiconductor wafer through the associated polarizing control element. The system may also include a third-order camera and an associated polarizing control element. The third-order camera may be configured to receive a fourth return beam of light from the particular area on the semiconductor wafer through the associated polarizing control element. Finally, the processor may be configured to receive signals from the third-order camera and to process the signals from the third-order camera in addition to the signals from the visible light camera, the visible light second harmonic generation camera, the infrared camera, the infrared second harmonic generation camera and the sum-frequency camera to detect unwanted elements and/or physical imperfections on the semiconductor wafer.

In another further embodiment, each of the light sources may include an intensity control for setting a predetermined intensity for a respective output beam of coherent light and/or a frequency control for setting a predetermined wavelength for a respective output beam of coherent light. In addition, each of the polarization control elements associated with the light sources may comprise at least one of a polarizer, a quarter wave plate, and a half wave plate.

In a still further embodiment, each of the cameras may include an intensity control for setting a predetermined intensity for a respective input beam of light and/or a frequency control for setting a predetermined wavelength for a respective input beam of light. In addition, each of the polarization control elements associated with the cameras may comprise at least one of a polarizer, a quarter wave plate, and a half wave plate.

In yet another further embodiment, the system may include a memory coupled to the processor. The memory may include a stored look-up table for use in identifying the various surface elements that may be present on the surface of the semiconductor wafer.

In a second aspect, an active real-time characterization system detects unwanted elements and/or physical imperfections on a semiconductor wafer during manufacturing. The system includes an infrared light source for outputting a beam of coherent infrared light and an associated polarizing control element. The infrared light source is configured to direct the beam of coherent infrared light at a particular area on the semiconductor wafer through the associated polarizing control element. The system also includes a first visible light source for outputting a first beam of coherent visible light and an associated polarizing control element. The first visible light source is configured to direct the first beam of coherent visible light at the same particular area on the semiconductor wafer through the associated polarizing control element. The system further includes a visible light camera and a visible light second harmonic generation camera each having an associated polarizing control element. The visible light camera and visible light second harmonic generation camera are each configured to receive a first predetermined return beam of light from the same particular area on the semiconductor wafer through the associated polarizing control element. The system still further includes an infrared camera and an infrared second harmonic generation camera each having an associated polarizing control element. The infrared camera and infrared second harmonic generation camera are each configured to receive a second predetermined return beam of light from the same particular area on the semiconductor wafer through the associated polarizing control element. Finally the system includes a processor coupled to receive signals from the visible light camera, the visible light second harmonic generation camera, the infrared camera, and the infrared second harmonic generation camera. The processor is configured to process the received signals to detect unwanted elements and/or physical imperfections on the semiconductor wafer.

In a further embodiment, the system may include a second visible light source for outputting a second beam of coherent visible light and an associated polarizing control element. The second visible light source may be configured to direct the second beam of coherent visible light at the same particular area on the semiconductor wafer through the associated polarizing control element. The system may further include a sum-frequency camera and an associated polarizing control element. The sum-frequency camera may be configured to receive a fourth return beam of light from the particular area on the semiconductor wafer through the associated polarizing control element. Finally, the processor may be configured to receive signals from the sum-frequency camera and to process the signals from the sum-frequency camera in addition to the signals from the visible light camera, the visible light second harmonic generation camera, the infrared camera, and the infrared second harmonic generation camera to detect unwanted elements and/or physical imperfections on the semiconductor wafer.

In a third aspect, a method detects unwanted elements and/or physical imperfections on a semiconductor wafer during manufacturing. Light beams are generated from an infrared light source and a first visible light source. The light beams are directed at a particular area on the semiconductor wafer via respective associated polarizing control elements. A visible light camera, a visible light second harmonic generation camera, an infrared camera, an infrared second harmonic generation camera and a sum-frequency camera are aligned to receive light from the infrared light source and first visible light source reflected from the particular area of the semiconductor wafer via respective associated polarizing control elements. Data is acquired from each of the cameras based on the received light. Finally, the acquired data from each of the cameras is processed to detect unwanted elements and/or physical imperfections on the semiconductor wafer.

In a further embodiment, a light beam from a second visible light source may be generated. The light beam from second visible light source may be directed at the particular area on the semiconductor wafer via an associated polarizing control element. A third-order camera may be aligned to receive light from the first visible light source and the second visible light source reflected from the particular area of the semiconductor wafer via an associated polarizing control element. Data may be acquired from the third-order camera. Finally, the data from the third-order camera and the data from the visible light camera, the visible light second harmonic generation camera, the infrared camera, the infrared second harmonic generation camera and the sum-frequency camera is processed to detect unwanted elements and/or physical imperfections on the semiconductor wafer.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
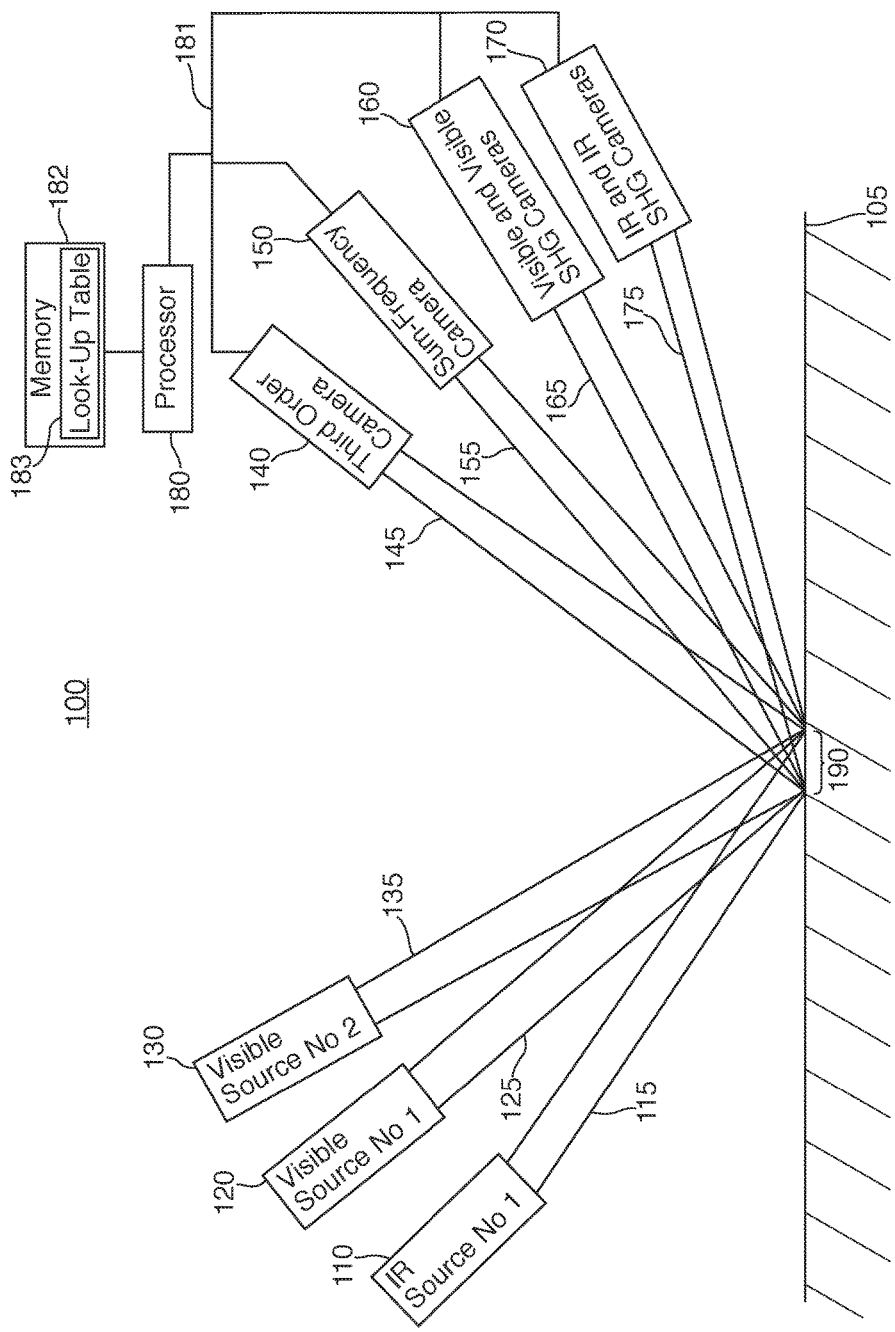
FIG. 1 is a block diagram of an active real-time characterization system for detecting unwanted elements and/or physical imperfections on a wafer during semiconductor manufacturing according to an aspect of the present disclosure.

Referring now to FIG. 1, the active real-time characterization system 100 of the present disclosure includes an infrared (IR) light source 110, a first visible light source 120 and a second visible light source 130. Each of the light sources 110, 120, 130 is positioned to direct a beam of coherent light at an area 190 on a surface 105 of an article under test, e.g., a semiconductor wafer. In particular, infrared (IR) source 110 is positioned to direct a beam of coherent light 115 at area 190, first visible light source 120 is positioned to direct a beam 125 of coherent light at area 190, and second visible light source 130 is positioned to direct a beam 135 of coherent light at area 190. The beams 115, 125, 135 may be emitted directly from the respective light sources 110, 120, 130 or may be emitted via respective optical fibers (and appropriate lenses, etc.) coupled to the light sources 110, 120, 130. When beams 115, 125, 135 are emitted via respective optical fibers, each light source 110, 120 130 consists of a laser of the appropriate type (visible or IR light) that is coupled to an input of an associated optical fiber via input optics. The laser is preferably a solid state laser or a diode laser and may be, for example, a diode laser, a continuous-wave diode laser, a solid state laser, a continuous-wave solid state laser, a flash-lamp pumped solid state laser, or a diode pumped solid state laser. The input optics consist of an input polarizer, an input wavelength discriminator, an input spatial filter and an input propagation optics. The input polarizer is, for example, a Brewster angle polarizer, a thin film polarizer, a Glan-air or Glan-Thompson polarizer or other crystal polarizer. The wavelength discriminator is, for example, a color filter, a dielectric film, a holographic transmission filter, or a grating. The input propagation optics is formed of one or more refractive or reflective optics which, when used in combination, control the divergence or convergence of the beam as it propagates towards the first input optical fiber. The input optics are optimized for the wavelength of the associated optical source. Coupling optics are coupled to an output of each optical fiber to direct the beam to area 190. IR light source 110 is configured to output light at a fixed, predetermined IR wavelength, while first visible light source 120 is configured to output light at a first fixed, predetermined visible wavelength and second visible light source 130 is configured to output light at a second fixed, predetermined visible wavelength, different from the first fixed, predetermined visible wavelength.

Figure 2:
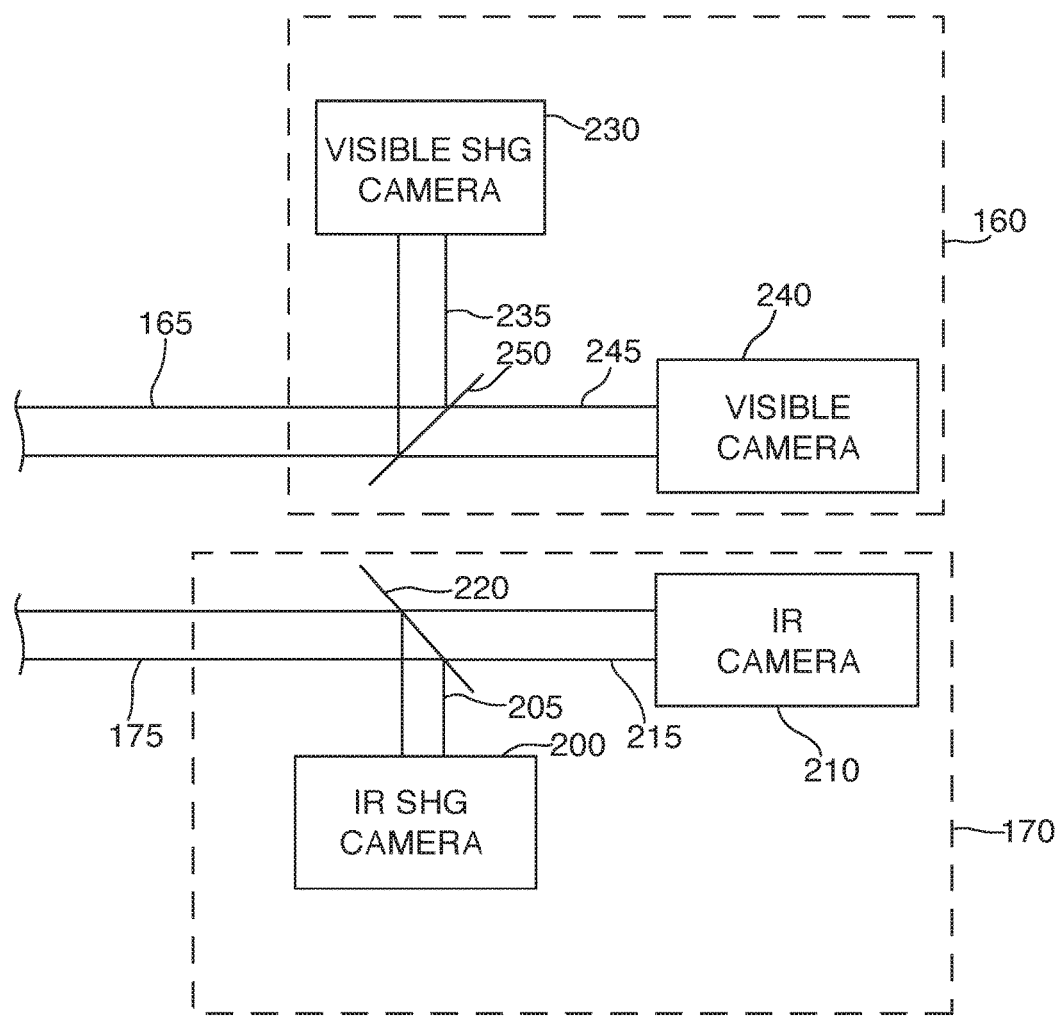
FIG. 2 is a block diagram showing the composition of the infrared light and visible light camera systems according to an aspect of the present disclosure.

System 100 in FIG. 1 also includes a number of cameras for detecting light reflected from the surface 105 of article under test, including a Raman (third-order) camera 140 which receives a light beam 145 and a sum-frequency camera 150 which receives a light beam 155. System 100 also includes paired visible and visible second harmonic generation (SHG) cameras 160 which receive a light beam 165, and paired IR and IR SHG cameras 170 which receive a light beam 175. Referring now to FIG. 2, the paired visible light and visible light second harmonic generation (SHG) cameras 160 include a visible light SHG camera 230 and a visible light camera 240 which are positioned to each receive light beam 165 via a beam splitter 250. In particular, beam splitter 250 is positioned to split light beam 165 into a first portion 235 that is provided to visible light SHG camera 230 and a second portion 245 that is provided to visible light camera 240. Similarly, the paired IR and IR second harmonic generation (SHG) cameras 170 include an IR SHG camera 200 and an IR camera 210 which are positioned to each receive light beam 175 via a beam splitter 220. In particular, beam splitter 220 is positioned to split light beam 175 into a first portion 205 that is provided to IR SHG camera 200 and a second portion 215 that is provided to IR camera 210. Each of the cameras 140, 150, 200, 210, 230 and 240 produces an output signal that is communicated in a conventional manner to a processor 180 in FIG. 1 via a link 181 for processing as discussed below. Processor 180 is also coupled to a memory 182 which includes a stored look-up table 183 for use in identifying the various surface elements that may be present on the surface 105 of the article under test. As also discussed below, the reflected light beams 145, 155, 165 and 175 are at a particular angle with respect to the surface 105 of the article under test based on the fixed angles that light beams 115, 125 and 135 are directed at the surface 105 of article under test. The cameras 140, 150, 200, 210, 230 and 240 are thus positioned to receive such light beams. Each camera 140, 150, 200, 210, 230, 240 is a conventional detector as defined below with respect to FIG. 4.

As one of ordinary skill in the art will readily recognize, light sources 110, 120, 130 and cameras 140, 150, 200, 210, 230 and 240 may be fixed in place and the article under test may be moved so that the area 190 of the light beams 115, 125, 135 moves over the entire surface 105 of the article under test. In another embodiment, light sources 110, 120, 130 and cameras 140, 150, 200, 210, 230 and 240 may be mounted on a fixture that moves along the surface 105 of the article under test. In yet another embodiment, light sources 110, 120, 130 may be arranged to raster the respective output light beams 115, 125, 135 across the surface 105 of the article under test, and the cameras 140, 150, 200, 210, 230 and 240 arranged to move proportionally to receive the respective associated return light beams 145, 155, 165, 175.

Figure 3:
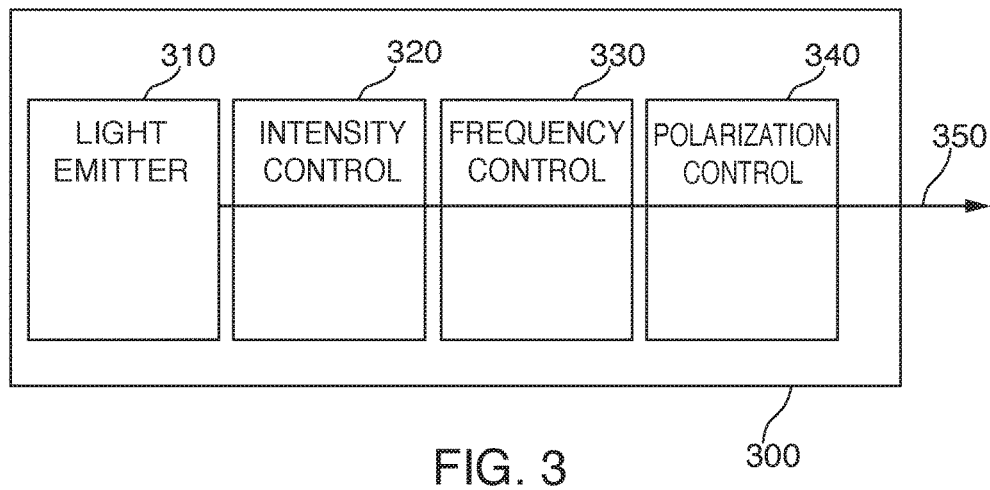
FIG. 3 is a block diagram showing the composition of the light sources according to an aspect of the present disclosure.

Referring now to FIG. 3, each of the light sources 110, 120, 130 is configured similarly, as shown by representative light source 300, but each may be configured for a different intensity, frequency and/or polarization. Light source 300 includes a light emitter 310, an intensity control element 320, a frequency control element 330 and a polarization control element 340 for outputting a light beam 350. Light emitter 310 is preferably a narrow frequency bandwidth visible pulse laser and, may be, for example a diode laser, a continuous wave diode laser or a solid state laser or a continuous wave solid state laser. Intensity control element 320 may include broadband filters for reducing intensity or may specifically refer to certain frequency notch filters which are intended to drop intensity levels where the cameras can act in a linear fashion. Frequency control element 330 can be accomplished in simple cases by frequency dependent color filters or notch filters and in more elaborate by a spectrophotometer that is typically composed of a diffraction grating which operates at a frequency or bandwidth of interest. The key point for the frequency control element 330 is to ensure that only light in beam 350 is directed at the surface 105 and that stray light produced by light emitter 310 is removed, and as one of ordinary skill in the art will readily recognize, other frequency selective elements may also be used. Polarization control element 340 is a set of polarizing sensitive devices which may consist of a number of separate optical elements, including, for example, a polarizer which only passes light of one polarization, and polarization modifying elements such as a halfway plate and/or a quarter wave plate. A halfway plate is used to rotate the polarization to the desired orientation. A quarter wave plate is used to change the polarization from linear to circular or from circular to linear as needed. As shown, the polarizer is the last element before light beam 350 leaves the source and heads for the surface 105. Each light source 110, 120, 130 is configured, based on the selection of light emitter 310, intensity control element 320, frequency control element 330 and polarization control element 340 in each to provide a respective beam 115, 125, 135 of coherent light.

Figure 4:
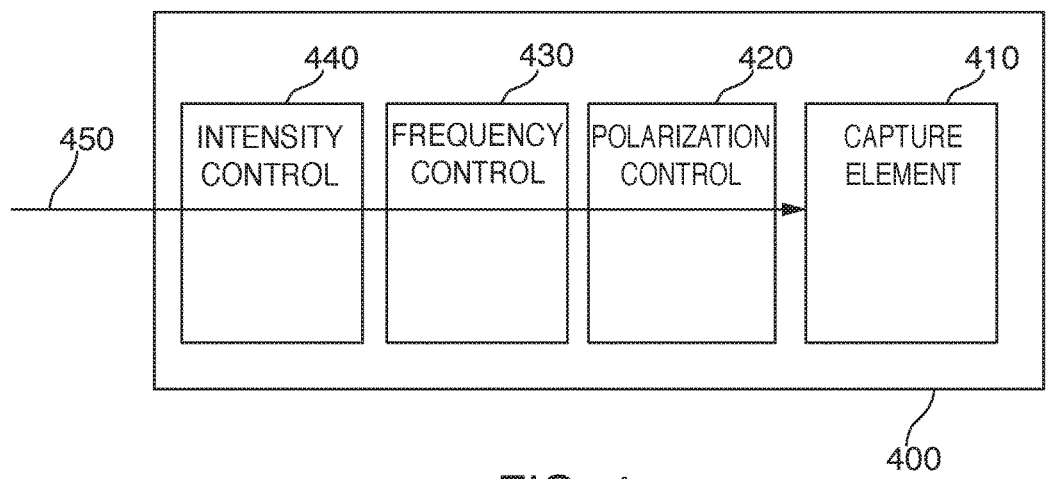
FIG. 4 is a block diagram showing the composition of the cameras according to an aspect of the present disclosure.

Referring now to FIG. 4, each of the cameras 140, 150, 200, 210, 230 and 240 is configured similarly, as shown by representative camera 400. Camera 400 includes a capture element 410, a polarization control element 420, a frequency control element 430 and an intensity control element 440 for receiving light beam 450. Exemplary capture elements 410 include, without limitation, cameras, charge-coupled devices, imaging arrays, photometers, and like devices. The frequency control element 430 and intensity control element 440 operate on light beam 450 in a similar manner as intensity control element 320 and frequency control element 330 operate on light beam 350 as discussed above. Preferably, polarization control element 420 consists the same elements as polarization control element 340 in reverse, e.g., a half wave plate and/or a quarter wave combination, followed by a polarizer.

In operation, the system 100 shown in FIG. 1 provides a combination of linear infrared spectroscopy, second order surface frequency mixing spectroscopy, and third-order non-linear optics (e.g., Raman spectroscopy) spectroscopy. System 100 provides a number of ways of performing species identification and allows the cross correlation between the three types of spectroscopies in order to avoid false negative spectral features.

In particular, visible light source 120 and IR light source 110 are configured and positioned to provide light signals which allow the processor 180 to generate simultaneous linear (same frequency) and non-linear (second harmonic generation) real time spectroscopic signals, in conjunction with paired visible light and visible light second harmonic generation (SHG) cameras 160 and paired IR and IR SHG cameras 170. As one of ordinary skill in the art will readily recognize, paired visible light and visible light second harmonic generation (SHG) cameras 160 and paired IR and IR SHG cameras 170 are positioned at a particular predetermined angle to receive the appropriate respective return light beams 165, 175 from surface 105.

Further, visible light source 120 and IR light source 110 are also configured and positioned to provide light signals which allow the processor 180 to generate a sum-frequency ($\omega_{IR}+\omega_{VISIBLE}$) real-time spectroscopic signal, in conjunction with sum-frequency camera 150. As one of ordinary skill in the art will readily recognize, sum-frequency camera 140 is positioned at a particular predetermined angle to receive the appropriate return light beams 155 from surface 105.

Finally, visible light source 120 and visible light source 130 are configured and positioned to provide light signals which allow the processor 180 to generate a third-order ($2\omega_{VIS1}-\omega_{VIS2}$) (e.g., Raman) real-time spectroscopic signal, in conjunction with Raman (third-order) camera 140. As one of ordinary skill in the art will readily recognize, Raman (third-order) camera 140 is positioned at a particular predetermined angle to receive the appropriate return light beams 145 from surface 105.

Processor 180 is coupled via link 181 to receive signals from each of cameras 140, 150, 200, 210, 230 and 240 and is configured to calculate in real time a linear spectroscopic signal, a second harmonic generation spectroscopic signal, a sum-frequency spectroscopic signal and a third-order spectroscopic signal based on the received signals. Processor 180 compares such calculated signals with information stored in look up table 183 in memory 182 in order to identify the basic elements, e.g., silicon (Si), hydrogen (H), or sodium (Na), which may be present on the surface 105 of the article under test during semiconductor growth. Processor 180 is thus able to identify the presence of unwanted elements, such as hydrogen, sodium, silicon with a dangling bond, based on the signals received from cameras 140, 150, 200, 210, 230 and 240. Because of the use of the polarization control elements 340, 420, these signals are spectrally sensitive and are thus extremely sensitive to the chemical state of any materials present at the area 190 on the surface 105 of the article under test. Semiconductor layer growth will show large changes in spectral response, i.e., the electronic and vibrational resonances of materials at the surface 105. In addition, physical damage, such as whisker formation, will show up spectrally and mechanically in the signals generated by processor 180. This occurs because of optical polarization and intensity scattering in the signals that becomes modified in the presence of such damage. The processor 180 may also be configured to compare each calculated signal with each other calculated signal and with predetermined baseline signals (e.g., from look-up table 183) to ensure that the composition on the surface of the article under test conforms to an expected value. When the processor 180 determines that the calculated signals indicate that the article under test does not conform to any expected value, processor 180 provides a fault signal which may be used to halt formation of the article under test for either repair thereof or so that the article under test may be immediately discarded.

Figure 5:
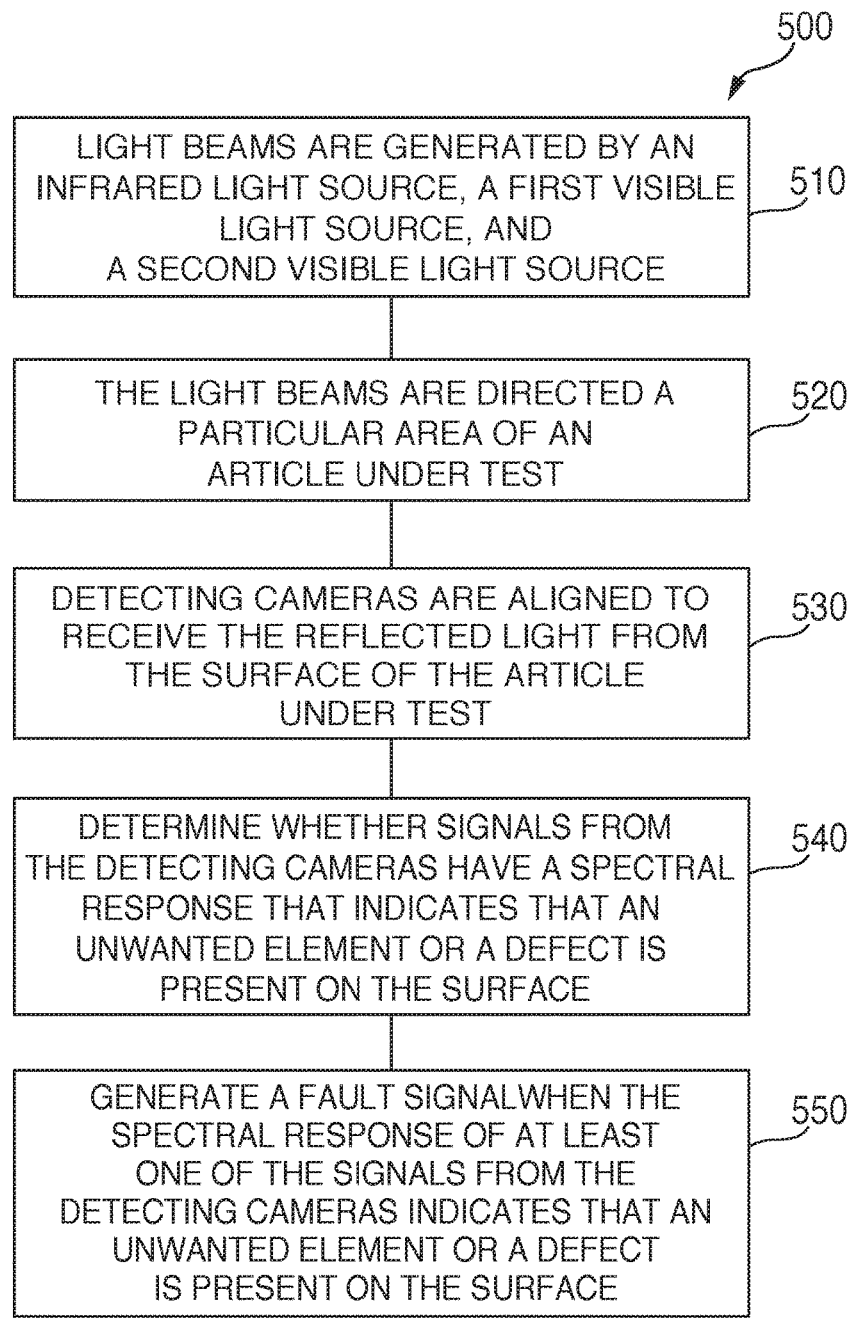
FIG. 5 is a flow chart of a method for operating the active real-time characterization system of the present disclosure.

Referring now to FIG. 5, a flow chart 500 of a method for operating the active real-time characterization system of the present disclosure is shown. In step 510, a light beam is generated by an infrared light source, a first visible light source, and/or a second visible light source. Each of the light sources includes a polarization control element on the output thereof. Next, at step 520, the light beam is directed at a particular area of an article under test (e.g., a semiconductor wafer). Thereafter, at step 530, detecting cameras are aligned to receive the reflected light from the surface of the article under test (e.g., a semiconductor wafer). Each of the cameras also includes a polarization control element on the output thereof. Next, at step 540, a processor determines, using a look-up table, whether signals from the detecting cameras have a spectral response that indicates that an unwanted element or a defect is present on the surface. Finally, at step 550, a fault signal is generated when the spectral response of at least one of the signals from the detecting cameras indicates that an unwanted element or a defect is present on the surface.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. An active real-time characterization system for detecting unwanted elements or physical imperfections on a semiconductor wafer during manufacturing, comprising:

an infrared light source for outputting a beam of coherent infrared light and an associated polarizing control element, the infrared light source configured to direct the beam of coherent infrared light at a particular area on the semiconductor wafer through the associated polarizing control element;

a first visible light source for outputting a first beam of coherent visible light and an associated polarizing control element, the first visible light source configured to direct the first beam of coherent visible light at the same particular area on the semiconductor wafer through the associated polarizing control element;

a visible light camera and a visible light second harmonic generation camera each having an associated polarizing control element, the visible light camera and the visible light second harmonic generation camera each configured to receive a first predetermined return beam of light from the particular area on the semiconductor wafer through the associated polarizing control element;

an infrared camera and an infrared second harmonic generation camera each having an associated polarizing control element, the infrared camera and the infrared second harmonic generation camera each configured to receive a second predetermined return beam of light from the particular area on the semiconductor wafer through the associated polarizing control element;

a sum-frequency camera and an associated polarizing control element, the sum-frequency camera configured to receive a third return beam of light from the particular area on the semiconductor wafer through the associated polarizing control element; and a processor coupled to receive first signals from the visible light camera, the visible light second harmonic generation camera, the infrared camera, the infrared second harmonic generation camera and the sum-frequency camera, the processor configured to process the first signals to detect the unwanted elements or the physical imperfections on the semiconductor wafer.

2. The active real-time characterization system of claim 1, further comprising:

a second visible light source for outputting a second beam of coherent visible light and an associated polarizing control element, the second visible light source configured to direct the second beam of coherent visible light at the same particular area on the semiconductor wafer through the associated polarizing control element;

a third-order camera and an associated polarizing control element, the third-order camera configured to receive a fourth return beam of light from the particular area on the semiconductor wafer through the associated polarizing control element; and wherein the processor is configured to receive second signals from the third-order camera and to process the second signals from the third-order camera in addition to the first signals from the visible light camera, the visible light second harmonic generation camera, the infrared camera, the infrared second harmonic generation camera, and the sum-frequency camera to detect unwanted elements or physical imperfections on the semiconductor wafer.

3. The active real-time characterization system of claim 1, wherein the infrared light source and the first visible light source each includes an intensity control for setting a predetermined intensity for a respective output beam of coherent light.

4. The active real-time characterization system of claim 1, wherein the infrared light source and the first visible light source each includes a frequency control for setting a predetermined wavelength for a respective output beam of coherent light.

5. The active real-time characterization system of claim 1, wherein each polarizing control element associated with the infrared light source or the first visible light source each comprises at least one of a polarizer, a quarter wave plate, or a half wave plate.

6. The active real-time characterization system of claim 1, wherein each of the visible light camera, the visible light second harmonic generation camera, the infrared camera, the infrared second harmonic generation camera, and the sum-frequency camera includes a capture element and an intensity control to filter a respective input beam of light directed towards the capture element to adjust an intensity of the respective input beam of light.

7. The active real-time characterization system of claim 1, wherein each of the visible light camera, the visible light second harmonic generation camera, the infrared camera, the infrared second harmonic generation camera, and the sum-frequency camera includes a capture element and a frequency control to filter a respective input beam of light directed towards the capture element to adjust a wavelength of the respective input beam of light.

8. The active real-time characterization system of claim 1, wherein each polarizing control element associated with the visible light camera, the visible light second harmonic generation camera, the infrared camera, the infrared second harmonic generation camera, or the sum-frequency camera each comprises at least one of a polarizer, a quarter wave plate, or a half wave plate.

9. The active real-time characterization system of claim 1, further comprising a memory coupled to the processor, the memory including a stored look-up table for use in identifying various surface elements detected on a surface of the semiconductor wafer.

10. An active real-time characterization system for detecting unwanted elements or physical imperfections on a semiconductor wafer during manufacturing, comprising:

an infrared light source for outputting a beam of coherent infrared light and an associated polarizing control element, the infrared light source configured to direct the beam of coherent infrared light at a particular area on the semiconductor wafer through the associated polarizing control element;

a first visible light source for outputting a first beam of coherent visible light and an associated polarizing control element, the first visible light source configured to direct the first beam of coherent visible light at the same particular area on the semiconductor wafer through the associated polarizing control element;

a visible light camera and a visible light second harmonic generation camera each having an associated polarizing control element, the visible light camera and the visible light second harmonic generation camera each configured to receive a first predetermined return beam of light from the same particular area on the semiconductor wafer through the associated polarizing control element;

an infrared camera and an infrared second harmonic generation camera each having an associated polarizing control element, the infrared camera and the infrared second harmonic generation camera each configured to receive a second predetermined return beam of light from the same particular area on the semiconductor wafer through the associated polarizing control element; and a processor coupled to receive first signals from the visible light camera, the visible light second harmonic generation camera, the infrared camera, and the infrared second harmonic generation camera, the processor configured to process the first signals to detect unwanted elements or physical imperfections on the semiconductor wafer.

11. The active real-time characterization system of claim 10, further comprising:

a second visible light source for outputting a second beam of coherent visible light and an associated polarizing control element, the second visible light source configured to direct the second beam of coherent visible light at the same particular area on the semiconductor wafer through the associated polarizing control element;

a sum-frequency camera and an associated polarizing control element, the sum-frequency camera configured to receive a fourth return beam of light from the particular area on the semiconductor wafer through the associated polarizing control element; and wherein the processor is configured to receive second signals from the sum-frequency camera and to process the second signals from the sum-frequency camera in addition to the first signals from the visible light camera, the visible light second harmonic generation camera, the infrared camera, and the infrared second harmonic generation camera to detect the unwanted elements or the physical imperfections on the semiconductor wafer.

12. The active real-time characterization system of claim 10, wherein the infrared light source and the first visible light source each includes an intensity control for setting a predetermined intensity for a respective output beam of coherent light.

13. The active real-time characterization system of claim 10, wherein the infrared light source and the first visible light source each includes a frequency control for setting a predetermined wavelength for a respective output beam of coherent light.

14. The active real-time characterization system of claim 10, wherein each polarizing control element associated with the infrared light source and the first visible light source each comprises at least one of a polarizer, a quarter wave plate, or a half wave plate.

15. The active real-time characterization system of claim 10, wherein each of the visible light camera, the visible light second harmonic generation camera, the infrared camera, the infrared second harmonic generation camera, and the sum-frequency camera includes a capture element and includes an intensity control to filter a respective input beam of light directed towards the capture element to adjust an intensity of the respective input beam of light.

16. The active real-time characterization system of claim 10, wherein each of the visible light camera, the visible light second harmonic generation camera, the infrared camera, the infrared second harmonic generation camera, and the sum-frequency camera includes a capture element and a frequency control to filter a respective input beam of light directed towards the capture element to adjust a wavelength of the respective input beam of light.

17. The active real-time characterization system of claim 10, wherein each polarizing control element associated with the visible light camera or the visible light second harmonic generation camera each comprises at least one of a polarizer, a quarter wave plate, or a half wave plate.

18. The active real-time characterization system of claim 10, further comprising a memory coupled to the processor, the memory including a stored look-up table for use in identifying various surface elements detected on a surface of the semiconductor wafer.

19. A method for detecting unwanted elements or physical imperfections on a semiconductor wafer during manufacturing, the method comprising:
generating light beams from an infrared light source and a first visible light source;
directing the light beams at a particular area on the semiconductor wafer via respective associated polarizing control elements;
receiving, at a visible light camera, a visible light second harmonic generation camera, an infrared camera, an infrared second harmonic generation camera, and a sum-frequency camera, light from the infrared light source and light from the first visible light source reflected from the particular area of the semiconductor wafer via respective associated polarizing control elements;
acquiring data from the visible light camera, the visible light second harmonic generation camera, the infrared camera, the infrared second harmonic generation camera, and the sum-frequency camera based on the received light; and
processing the acquired data from the visible light camera, the visible light second harmonic generation camera, the infrared camera, the infrared second harmonic generation camera, and the sum-frequency camera to detect unwanted elements or physical imperfections on the semiconductor wafer.

20. The method of claim 19, further comprising:
generating a light beam from a second visible light source;
directing the second visible light source at the particular area on the semiconductor wafer via an associated polarizing control element;
receiving, at a third-order camera, light from the first visible light source and light from the second visible light source reflected from the particular area of the semiconductor wafer via an associated polarizing control element;
acquiring data from the third-order camera; and
processing the data from the third-order camera and the data from the visible light camera, the visible light second harmonic generation camera, the infrared camera, the infrared second harmonic generation camera, and the sum-frequency camera to detect the unwanted elements or the physical imperfections on the semiconductor wafer.

\* \* \* \* \*